A. RANSOME.
Drag Sawing-Machine.
No. 206,404. Patented July 30, 1878.
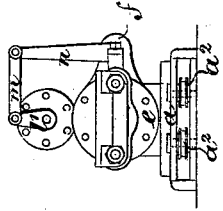
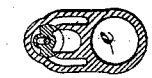
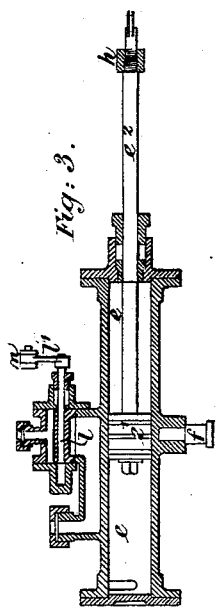
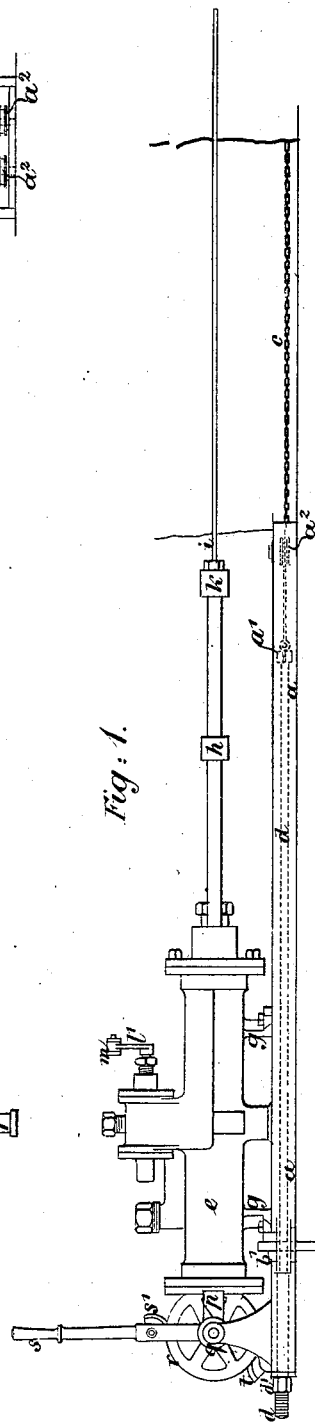
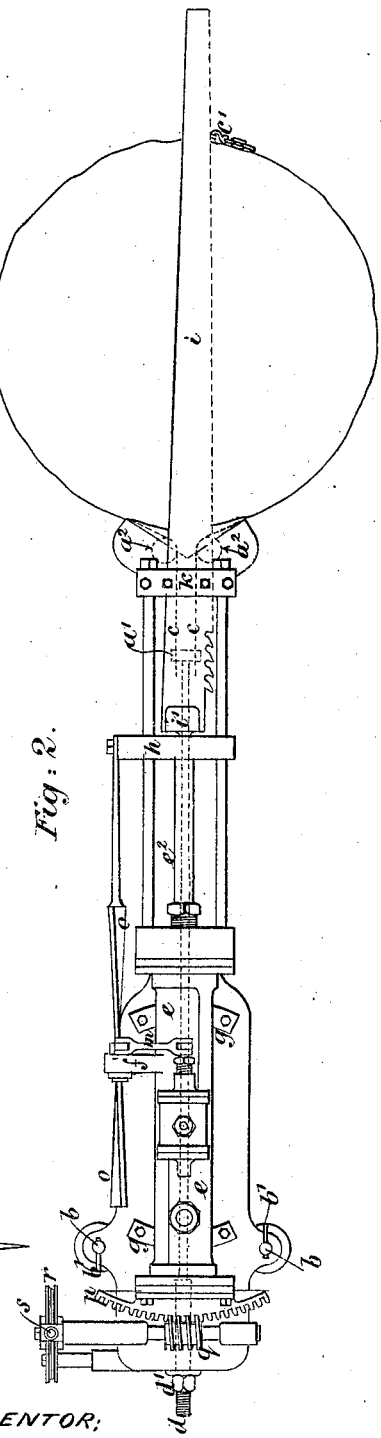
WITNESSES:
Wm A Skinkle
Geo W Breck
INVENTOR:
Allen Ransome,
By his Attorneys
Baldwin, Hopkins & Peyton

UNITED STATES PATENT OFFICE.

ALLEN RANSOME, OF THE EUKESTONS, CLAPHAM COMMON, ENGLAND.

IMPROVEMENT IN DRAG-SAWING MACHINES.

Specification forming part of Letters Patent No. 206,404, dated July 30, 1878; application filed May 7, 1878.

*To all whom it may concern:*

Be it known that I, ALLEN RANSOME, of the Eukestons, Clapham Common, in the county of Surrey, England, have invented new and useful Improvements in Machinery for Felling Trees, which improvements are fully set forth in the following specification, reference being had to the accompanying drawings.

My invention relates to improvements in portable tree-felling machinery worked by steam, of the class in which the saw is connected directly with the piston-rod of the engine.

I employ a steam-cylinder with a length of stroke equal to that of the saw, and the saw is actuated directly by the steam-cylinder. The cylinder lies upon and is secured to a base plate or frame, which is so made that it can be conveniently carried from place to place, and can be staked down to the ground at the foot of the tree to be felled. A portable boiler is employed to supply steam, and a flexible steam pipe or hose conveys the steam from the boiler to the cylinder. At each stroke the saw is moved round a short distance, and so by degrees the saw is caused to pass through the tree from side to side. This is effected by mounting the cylinder upon a pivot, and causing the cylinder to turn slowly round on this pivot. This turning motion may be given to the cylinder by means of a worm gearing into a tooth-rack upon the cylinder, or by other suitable arrangement of gearing upon the base plate or frame for turning the pivoted cylinder horizontally upon said frame.

In order that my said invention may be most fully understood and readily carried into effect, I will proceed to describe the drawings hereunto annexed.

Figure 1 is an elevation, and Fig. 2 is a plan, of the machine.

$a\ a$ is the bed-plate. It is adapted to abut at one end against the tree to be felled, and at the other end there are two holes formed in it to receive two pegs, $b\ b$. These are driven into the ground in proper positions before the bed-plate is placed. $b'\ b'$ are collars passed through the heads of the pegs $b$. $c\ c$ are two chains fixed to a cross-head, $a^1$, and passed between the guide-pulleys $a^2\ a^2$, and so around the tree. The ends of the chains are hooked together at $c'$, and they are drawn tight by the bolt $d$, passing from the cross-head $a^1$ through the end of the bed-plate, where it receives a nut, $d'$.

$e$ is a steam-cylinder, with its piston $e^1$ and rod $e^2$. (Shown with other parts in section at Fig. 3.) The cylinder is connected with the bed-plate by a pivot, $f$, and guides $g\ g$, which leave it free to turn through an arc of considerable size. The piston-rod is attached to a cross-head, $h$. It works on guide-bars fixed to the cylinder-cover, and the buckle $i'$, holding the saw $i$, is also attached to it. The saw works between adjustable packings at $k$.

The steam is admitted to and allowed to escape from the cylinder by means of a semi-rotary valve. (Shown in section at Fig. 4.) It is held in its seat by the pressure of the steam, and is turned by means of the spindle $l$, which has an arm, $l'$, upon it, and this is connected by the link $m$ (seen in the end view, Fig. 5) with a lever, $n$. The lever $n$ is carried by a bracket, $f'$, on the side of the cylinder $e$, and the boss of the lever is slotted for the twisted bar $o$ to pass through it. The bar $o$ is attached to the cross-head $h$, and, moving with the piston-rod, gives a rocking motion to the lever $n$, and the necessary semi-rotary motion to the valve.

To press the saw up to its work there is a toothed arc, $p$, fixed to the cylinder, and with this a worm, $q$, engages. $r$ is a wheel on the axis of the worm, and $s$ is a hand-lever, with a griping-pawl, $s'$, upon it. There is another locking-pawl at $t$, and both the pawls take hold of the wheel $r$ in such manner that by moving the lever $s$ to and fro the worm can be rotated and the saw kept up to its work.

Portable tree-felling machinery worked by steam is old, and is not, therefore, broadly claimed herein; nor do I claim, broadly, such machinery having the saw connected directly with the piston-rod, and capable of moving into the cut as the sawing of a tree progresses, as this is old; so also is an adjustable or turning cylinder, and I do not claim such a cylinder *per se*.

Having thus described the nature of my said invention, and the manner of performing the same, I would have it understood that I claim—

1. The combination, substantially as hereinbefore set forth, in portable tree-felling machinery, of the bed-plate or frame, adapted to rest flat upon the ground and be held up to the tree to be felled, the cylinder pivoted upon the frame, the piston, the saw attached to the piston-rod, and devices, substantially such as described, for turning the pivoted cylinder upon the frame, for the purpose specified.

2. The combination of the bed-plate or frame, the pivoted horizontally-turning cylinder, its guides, and the toothed arc, substantially as and for the purposes set forth.

3. The combination of the bed plate or frame, adapted to abut at one end against a tree to be felled, and to be staked down to the ground, the turning cylinder, the saw operated by the piston, the cross-head $a^1$, adjustable lengthwise of the bed-plate, the chains, and their guide-pulleys, these members being constructed and operating substantially as hereinbefore set forth.

4. The combination, substantially as hereinbefore set forth, of the bed-plate or frame, the turning cylinder, the piston, the saw attached to the piston-rod, the cross-head $h$, also attached to the piston-rod, the guide-bars on which the cross-head works, the bar $o$, attached to the cross-head, the rotary valve, and the connections between the valve and said bar, for the purpose specified.

5. The combination of the bed-plate or frame, the pivoted cylinder, the toothed arc on the cylinder, the worm engaging therewith, the wheel on the worm-axis, the lever, and the pawls, these members being constructed and operating substantially as hereinbefore set forth.

ALLEN RANSOME.

Witnesses:
   CHAS. BERKLEY HARRIS,
      17 *Gracechurch Street, London.*
   JNO. DEAN,
      17 *Gracechurch Street, London.*